(12) United States Patent
Rusek et al.

(10) Patent No.: US 9,083,597 B1
(45) Date of Patent: Jul. 14, 2015

(54) METHOD AND RECEIVER IN A WIRELESS COMMUNICATION SYSTEM

(71) Applicant: Huawei Technologies Co., Ltd., Shenzhen (CN)

(72) Inventors: Fredrik Rusek, Lund (SE); Basuki Endah Priyanto, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/553,845

(22) Filed: Nov. 25, 2014

(30) Foreign Application Priority Data

Dec. 19, 2013 (EP) ..................................... 13198573

(51) Int. Cl.
*H04L 27/06* (2006.01)
*H04L 27/26* (2006.01)
*H04L 27/16* (2006.01)

(52) U.S. Cl.
CPC ............ *H04L 27/2672* (2013.01); *H04L 27/16* (2013.01)

(58) Field of Classification Search
CPC . H04L 27/2675; H04L 5/0007; H04L 1/0054; H04L 1/005; H04L 27/2601; H04L 27/2647; H04L 27/2695; H04L 5/0048; H04L 1/0631; H03M 13/1117; H04J 1/00

USPC .................................................. 375/260, 340
See application file for complete search history.

(56) References Cited

U.S. PATENT DOCUMENTS

| | | | |
|---|---|---|---|
| 2006/0262868 A1* | 11/2006 | Leshem | 375/260 |
| 2007/0071123 A1* | 3/2007 | Charbit | 375/260 |
| 2010/0128824 A1* | 5/2010 | Hui | 375/344 |
| 2014/0177762 A1* | 6/2014 | Gotman et al. | 375/340 |

OTHER PUBLICATIONS

Khal et al., "Robustness of Joint Bayesian Frequency Offset and Channel Estimation Based on Basis Expansion Models," 2009 Conference Record of the Forty-Third Asilomar Conference on Signals, Systems, and Computers, pp. 957-961, Institute of Electrical and Electronics Engineers, New York, New York (Nov. 1-4, 2009).

(Continued)

*Primary Examiner* — Don N Vo
(74) *Attorney, Agent, or Firm* — Leydig, Voit & Mayer, Ltd.

(57) ABSTRACT

Receiver and method in a receiver, for estimating a normalised frequency offset between a transmitter and the receiver in a wireless communication system, based on Orthogonal Frequency Division Multiplexing, OFDM. The method comprises receiving a first pilot signal ($y_r 1$) and a second pilot signal ($y_r 2$) from the transmitter; computing a Karhunen-Loeve approximation $\lambda_K(\phi)$, up to any finite order K of a log-likelihood function $\lambda(\phi)$, based on the received pilot signals ($y_r 1, y_r 2$); and estimating the frequency offset by calculating a maximum value of the computed Karhunen-Loeve approximation $\lambda_K(\phi)$.

15 Claims, 6 Drawing Sheets

(56) References Cited

OTHER PUBLICATIONS

Nguyen-Le et al., "ML-Based Joint Estimation of Carrier Frequency Offset and Doubly Selective Channels for OFDM Transmissions," 2009 IEEE 69th Vehicular Technology Conference, Barcelona, Spain, pp. 1-5, Institute of Electrical and Electronics Engineers, New York, New York (Apr. 26-29, 2009).

Liu et al., "A Blind Maximum Likelihood Carrier Frequency Offset Correction Approach for OFDM Systems over Multipath Fading Channels," Circuits, Systems and Signal Processing, pp. 43-54, vol. 26, No. 1, Birkhauser-Verlag, Boston, Massachusetts (Feb. 1, 2007).

Brown et al., "NMR Spectral Quantitation by Principal-Component Analysis. II. Determination of Frequency and Phase Shifts," Journal of Magnetic Resonance Series B, pp. 32-43, vol. 112, No. 1, Academic Press, Orlando, Florida (Jul. 1, 1996).

Visintin, "Karhunen-Loeve expansion of a fast Rayleigh fading process," Electronics Letters, pp. 1712-1713, vol. 32, No. 18, Institute of Electrical and Electronics Engineers, New York, New York (Aug. 29, 1996).

Lei et al., "A New Pilot Assisted Frequency Synchronization for Wireless OFDM Systems," International Conference on Acoustics, Speech, and Signal Processing, pp. 700-703, Institute of Electrical and Electronics Engineers, New York, New York ( Apr. 6-10, 2003).

Moose, "A Technique for Orthogonal Frequency Division Multiplexing Frequency Offset Correction," IEEE Transactions on Communications, pp. 2908-2914, vol. 42, No. 10, Institute of Electrical and Electronics Engineers, New York, New York (Oct. 1994).

Andgart et al., "Frequency offset estimation with increased Nyquist frequency," 2010 IEEE 72nd Vehicular Technology Conference Fall, Ottawa, Ontario, Institute of Electrical and Electronics Engineers, New York, New York (Sep. 6-9, 2010).

Van De Beek et al., "ML Estimation of Time and Frequency Offset in OFDM Systems," IEEE Transactions on Signal Processing, pp. 1800-1805, vol. 45, No. 7, Institute of Electrical and Electronics Engineers, New York, New York (Jul. 1997).

Kapoor et al., "Pilot Assisted Synchronization for Wireless OFDM Systems Over Fast Time Varying Fading Channels," 48th IEEE Vehicular Technology Conference, Ottawa, Ontario, pp. 2077-2080, vol. 3, Institute of Electrical and Electronics Engineers, New York, New York (May 18-21, 1998).

\* cited by examiner

METHOD AND RECEIVER IN A WIRELESS COMMUNICATION SYSTEM

CROSS-REFERENCE TO RELATED APPLICATIONS

This application claims priority to European Patent Application No. EP13198573.1, filed on Dec. 19, 2013, which is hereby incorporated by reference in its entirety.

TECHNICAL FIELD

Implementations described herein generally pertain to a receiver and a method in a receiver, and more particularly to a mechanism for estimating frequency offset between transmitter and receiver in a wireless communication system.

BACKGROUND

A User Equipment (UE), also known as a mobile station, wireless terminal and/or mobile terminal is enabled to communicate wirelessly in a wireless communication system, sometimes also referred to as a cellular radio system or a wireless communication network. The communication may be made, e.g., between UEs, between a UE and a wire connected telephone and/or between a UE and a server via a Radio Access Network (RAN) and possibly one or more core networks. The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The wireless communication system covers a geographical area which is divided into cell areas, with each cell area being served by a radio network node, or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE) radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the UE. The expression uplink, upstream link or reverse link may be used for the transmission path in the opposite direction, i.e., from the UE to the radio network node.

Orthogonal Frequency Division Multiplexing (OFDM) is the dominant modulation technique in contemporary systems such as LTE and WIFI. OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier.

A common, and severe, problem of OFDM is frequency offset between the transmitting part and the receiving part. This is herein referred to as Carrier Frequency Offset (CFO). A CFO implies that the transmitter and the receiver are misaligned with each other and the effect of this is that orthogonality among the OFDM sub-carriers is lost. As orthogonality among sub-carriers is the whole point of OFDM, this situation is unacceptable and counter-measures must be taken. In the case that the CFO would be known to the receiver, it can simply compensate for the CFO by a frequency shift, and orthogonality is assured. Hence, mitigating CFOs is equivalent to the problem of estimating the CFO from the received data.

The CFO is usually broken up into two parts, the Integer Frequency Offset (IFO) and the Fractional Frequency Offset (FF0):

$$\epsilon_{CFO} = \epsilon_{IFO} + \epsilon_{FFO}$$

where $\epsilon_{IFO}$ is an integer multiplied by the sub-carrier spacing and $\epsilon_{FF0}$ is limited in magnitude to half the sub-carrier spacing. In LTE, the sub-carrier spacing is 15 kHz, so the FFO is limited to 7.5 kHz in magnitude, and the IFO can be ..., −30 kHz, −15 kHz, 0, 15 kHz, 30 kHz, ...

During initial synchronization, the precise value of $\epsilon_{IFO}$ is obtained. Hence, the remaining task is to estimate the FFO. Throughout this disclosure, it is assumed that the IFO has already been estimated, e.g. during initial synchronization. It is standard notational procedure to normalize all offsets by the subcarrier spacing, so that the FFO is limited to $\epsilon_{FFO} \in [-\frac{1}{2}, \frac{1}{2}]$ and:

$$\epsilon_{IFO} \in \{\ldots, -3, -2, -1, 0, 1, 2, 3, \ldots\}.$$

The FFO must be estimated based on the received signals. It is herein assumed that two OFDM symbols are available. A condition for enabling calibration to work is that these two symbols comprise training symbols, a.k.a., pilot symbols. If so, then based on these two OFDM symbols it is desired to have a (near)-optimal FFO estimator algorithm capable of dealing with an arbitrary FFO in the range $\epsilon_{FFO} \in [-\frac{1}{2}, \frac{1}{2}]$.

A system model will subsequently be described. Let $s_{r1}$ and $s_{r2}$ denote the received OFDM symbols at time r1 and r2, respectively. Further, it may be assumed that time synchronisation and IFO compensation have been carried out so that the Cyclic Prefix (CP) has been removed from the two symbols and the CFO is at most 0.5 in magnitude (i.e., only the FFO remains). Let $\tilde{s}_{r1}$ and $\tilde{s}_{r2}$ denote the two signals in the case of no FFO at all. Then: $s_k = D_k(\epsilon_{FF0}) \tilde{s}_k$, $k \in \{r1, r2\}$, where $D_k(\epsilon_{FFO})$ is the diagonal matrix:

$$D_k(\varepsilon_{FFO}) = \text{diag}\left\{\exp\left(2\pi i \varepsilon_{FFO}\left[\frac{n-1}{N_{FFT}} + k\Delta\right]\right)\right\}_{n=1}^{N_{FFT}}$$

Where $N_{FFT}$ is the FFT-size and $\Delta$ is the separation of the two symbols $s_{r1}$ and $s_{r2}$ measured in units of one OFDM symbol length including the Cyclic Prefix.

Example: when the Cyclic Prefix is $N_{CP}$ samples long, then:

$$\Delta = (r2-r1)(N_{FFT}+N_{CP})/N_{FFT}.$$

Let Q denote the Discrete Fourier Transform (DFT) matrix of size $N_{FFT}$. Thus $QD_k^H(\varepsilon_{FFO})s_k = H_k x_k$, where $H_k$ is a diagonal matrix comprising the frequency response of the channel along its main diagonal and $x_k$ is a column vector with the transmitted frequency symbols. The vector $x_k$, comprises both training symbols and payload data. Let $\gamma_k$ denote the set of positions of $x_k$ that are allocated to training symbols. Also, $x_k = p_k + d_k$ where $p_k$ is the vector of training symbols satisfying $P_k[l]=0, l \notin \gamma_k$, i.e., there is no training symbols at the data positions, and $d_k$ are the data symbols satisfying $d_k[l]=0, l \in \gamma_k$, i.e., there is no data at the training positions. It may be assumed that the pilot positions are not dependent on the OFDM symbol index, hence $\gamma_r = \gamma_t = \gamma$.

The problem of FFO estimation is well known and has a long and rich history. There are two main branches for FFO estimation: (1) time-domain approaches and (2) frequency domain approaches.

In the time-domain approach, the redundancy added in the Cyclic Prefix, is utilised. Several disadvantages are however associated with this approach such as e.g. that the estimators suffer from problems with DC offsets, spurs and narrow band interferences.

When describing a periodic function in the frequency domain, DC offset, or the DC bias/DC component/DC coefficient as it also may be referred to, is the mean value of the waveform. If the mean amplitude is zero, there is no DC offset.

Within the frequency domain approaches, the baseline method is to make the approximation:

$$Z_k = Qs_k \approx \exp(i2\pi\varepsilon_{FFO}\Delta)H_k x_k$$

that is, after the FFT, the FFO shows up multiplicatively at each sub-carrier.

Thermal noise on the observations has here been omitted. At the positions specified in the pilot position set $\gamma$, the symbols in $x_k$ are known. Thereby, the FFO may be estimated as:

$$\hat{\varepsilon}_{FFO} = \frac{1}{2\pi\Delta}\arg\left\{\sum_{l \in \gamma} \frac{z_{r1}^H[l]}{p_{r1}^H[l]} \frac{z_{r2}[l]}{p_{r2}[l]}\right\}.$$

The baseline frequency based estimator however suffers from two main problems: (i) The approximation $z_{k=Qsk} \approx \exp(i2\pi\varepsilon_{FFO}\Delta)H_k x_k$ is only an approximation, and introduces additional noise into the system. It is not optimal in any sense, although complexity wise attractive.

The second (ii) problem is that it is limited to a maximal FFO of $\frac{1}{2}\Delta$. In LTE, a typical value for $\Delta$ may be approximately e.g. 3.21, which results from using OFDM symbol 4 and 7 within each sub-frame and using the normal CP. This means that the maximal FFO possible to detect is only $|\varepsilon_{FFO}| < \varepsilon_{max} = \frac{1}{2}\Delta = 0.1667 \approx 2.33$ kHz. This is far less than half the sub-carrier spacing of 7.5 kHz. As a remedy to the second problem, an extension of the baseline in order to extend the maximal FFO to 0.5-corresponding to 7.5 kHz in LTE may be made according to some prior art solutions. However, such solution comprises the use of more than two OFDM symbols in the FFO estimation. Further, the problem (i) is not dealt with and will ultimately limit the performance.

Yet another method to deal with the second (ii) problem is to use three identical copies of the baseline method in order to cover three times as large FFO interval. The first copy is shifted in frequency into 4.66 kHz, and the third copy is shifted to 4.66 kHz. The second copy is not shifted and is the normal baseline method. After the frequency shifts, an evaluation may be made:

$$\hat{\varepsilon}_{FFO} = \frac{1}{2\pi\Delta}\arg\left\{\sum_{l \in \gamma} \frac{z_{r1}^H[l]}{p_{r1}^H[l]} \frac{z_{r2}[l]}{p_{r2}[l]}\right\}$$

three times, once for each frequency shift. Then the final output is the estimate with maximal value of:

$$\sum_{l \in \gamma} \frac{z_{r1}^H[l]}{p_{r1}^H[l]} \frac{z_{r2}[l]}{p_{r2}[l]}.$$

This algorithm may be referred to as "extended baseline". However, this algorithm performs poorly, as it does not adequately address the problem (i).

Thus, there is room for improvement when estimating carrier frequency offset.

SUMMARY

It is therefore an object to obviate at least some of the above mentioned disadvantages and to improve the performance in a wireless communication system.

This and other objects are achieved by the features of the appended independent claims. Further implementation forms are apparent from the dependent claims, the description and the figures.

According to a first aspect, a method is provided in a receiver, for estimating a normalised frequency offset between a transmitter and the receiver in a wireless communication system, based on Orthogonal Frequency Division Multiplexing (OFDM). The method comprises receiving a first pilot signal and a second pilot signal from the transmitter. Also, the method comprises computing a Karhunen-Loeve approximation $\lambda_K(\phi)$, up to any finite order K of a log-likelihood function $\lambda(\phi)$, based on the received pilot signals. Further, the method also comprises estimating the frequency offset by calculating a maximum value of the computed Karhunen-Loeve approximation $\lambda_K(\phi)$.

In a first possible implementation of the method according to the first aspect, K=3 and the representation $\lambda_3(\phi)$ of the log-likelihood function $\lambda(\phi)$ may comprise a set of three basis functions $\phi_1(\phi)$, $\phi_2(\phi)$, $\phi_3(\phi)$.

In a second possible implementation of the method according to the first possible implementation of the method according to the first aspect, the basis functions $\phi_1(\phi)$, $\phi_2(\phi)$, $\phi_3(\phi)$ may be constructed on the form: $\phi_k(\phi) = \exp(-i2\pi\psi[\Delta + f_k])$.

In a third possible implementation of the method according to the second possible implementation of the method, the parameter $f_k$ may be computed by:

$$f_k = (k-2) \cdot f_\Delta; \text{ wherein } 0.3 \leq f_\Delta \leq 0.7 \text{ and } 1 \leq k \leq 3.$$

In a fourth possible implementation of the method according to the third possible implementation of the method according to the first aspect, $f_\Delta = 0.5$.

In a fifth possible implementation of the method according to the first aspect, or any previous possible implementation of the method according to the first aspect, the log-likelihood function $\lambda_3(\phi)$ is constructed by:

$$\lambda_3(\phi) = \text{Re}\left\{\sum_{k=1}^{3} \alpha_k \cdot \varphi_k(\phi)\right\}.$$

Wherein $\lambda_3(\phi)$ is an approximation of $\lambda(\phi)$ comprising three basis functions, i.e. $k=3$.

In a sixth possible implementation of the method according to the first aspect, or any previous possible implementation of the method according to the first aspect, three values of the log-likelihood function $\lambda_3(\phi)$ may be evaluated at $\phi=-\theta, 0, \theta$, wherein $0.3 \le \theta \le 0.4$.

In a seventh possible implementation of the method according to the first aspect, or any previous possible implementation of the method according to the first aspect, the log-likelihood function $\lambda_3(\phi)$ may be computed by finding the coefficients $\alpha_1, \alpha_2, \alpha_3$, multiplying them with the corresponding basis functions $\phi_1(\phi), \phi_2(\phi), \phi_3(\phi)$, and then computing the sum of the three terms.

In an eighth possible implementation of the method according to the first aspect, or any previous possible implementation of the method according to the first aspect, the coefficients $\alpha_1, \alpha_2, \alpha_3$ may be computed as:

$$\begin{bmatrix} \alpha_1 \\ \alpha_2 \\ \alpha_3 \end{bmatrix} = \begin{bmatrix} \varphi_1(-\theta) & \varphi_2(-\theta) & \varphi_3(-\theta) \\ \varphi_1(0) & \varphi_2(0) & \varphi_3(0) \\ \varphi_1(\theta) & \varphi_2(\theta) & \varphi_3(\theta) \end{bmatrix}^{-1} \begin{bmatrix} \lambda(-\theta) \\ \lambda(0) \\ \lambda(\theta) \end{bmatrix}.$$

In a ninth possible implementation of the method according to the first aspect, or any previous possible implementation of the method according to the first aspect, the maximum value of the computed function $\lambda_3(\phi)$ may be estimated by application of an optimisation algorithm.

In a tenth possible implementation of the method according to the first aspect, or any previous possible implementation of the method according to the first aspect, the maximum value of the computed function $\lambda_3(\phi)$ may be estimated by: selecting P values $\phi$ such that $\phi \in \{\phi_1, \phi_2, \ldots, \phi_P\}$ within $[-0.5, 0.5]$; computing P values of $\lambda_3(\phi)$ at $\phi \in \{\phi_1, \phi_2, \ldots, \phi_P\}$; determining the biggest value of $\lambda_3(\phi)$, denoted by $\lambda_{max}$, as $\lambda_{max} = \max \lambda_3(\phi_m)$, $1 \le m \le P$, and corresponding value of $\phi$ denoted $\phi_{max}$; and utilising the determined biggest value $\lambda_{max}$ and corresponding value $\phi_{max}$ as a starting point in a line search algorithm to find the maximum of $\lambda_3(\phi)$.

In an eleventh possible implementation of the method according to the first aspect, or any previous possible implementation of the method according to the first aspect, when having determined the biggest value $\lambda_{max}$ and corresponding value $\phi_{max}$, an assumption may be made that the maximum value of $\lambda_3(\phi)$ is within an interval:

$$\phi \in \frac{2\phi_{max} - 2 - P}{2P}, \frac{2\phi_{max} - P}{2P}.$$

In a twelfth possible implementation of the method according to the first aspect, or any previous possible implementation of the method according to the first aspect, a golden section search with M iterations may be performed for finding the maximum value of $\lambda_3(\phi)$ within the interval.

In a thirteenth possible implementation of the method according to the first aspect, or any previous possible implementation of the method according to the first aspect, the receiver may be represented by a User Equipment (UE) and the transmitter may be represented by a radio network node.

In a second aspect, a receiver is provided for estimating a normalised frequency offset between a transmitter and the receiver in a wireless communication system, based on OFDM. The receiver comprises a receiving circuit, configured for receiving a first pilot signal and a second pilot signal from the transmitter. Also, the receiver comprises a processor, configured for computing a Karhunen-Loeve approximation $\lambda_K(\phi)$, up to any finite order K of a log-likelihood function $\lambda(\phi)$, based on the received pilot signals and additionally configured for estimating the frequency offset by calculating a maximum value of the computed Karhunen-Loeve approximation $\lambda_K(\phi)$.

In a first possible implementation of the second aspect, the processor may be further configured for implementing the method according to the first aspect, or any previous possible implementation of the first aspect.

In another aspect, a receiver is provided for estimating a normalised frequency offset between a transmitter and the receiver in a wireless communication system, based on OFDM. The receiver comprises a receiving circuit, configured for receiving a first pilot signal and a second pilot signal from the transmitter. The receiver may comprise a computing unit, configured for computing a Karhunen-Loeve approximation $\lambda_K(\phi)$, up to any finite order K of a log-likelihood function $\lambda(\phi)$, based on received first and second pilot signals. Further, the receiver may also comprise an estimating unit, configured for estimating the frequency offset by calculating a maximum value of the computed Karhunen-Loeve approximation $\lambda_K(\phi)$.

According to a third aspect, a computer program comprising program code is provided for performing a method according to the first aspect, or any previous possible implementation of the first aspect, for estimating frequency offset between transmitter and receiver in a wireless communication system, based on OFDM, when the computer program is loaded into a processor of the receiver, according to the second aspect, or any previous possible implementation of the second aspect.

According to a fourth aspect, a computer program product is provided, comprising a computer readable storage medium storing program code thereon for estimating frequency offset between transmitter and receiver in a wireless communication system, based on OFDM, wherein the program code comprises instructions for executing a method comprising receiving a first pilot signal and a second pilot signal from the transmitter. Also, the method comprises computing a Karhunen-Loeve approximation $\lambda_K(\phi)$, up to any finite order K of a log-likelihood function $\lambda(\phi)$, based on the received pilot signals. Furthermore, the method in addition comprises estimating the frequency offset by calculating a maximum value of the computed Karhunen-Loeve approximation $\lambda_K(\phi)$.

According to another aspect, a computer program product is provided, comprising a computer readable storage medium storing program code thereon for estimating frequency offset between transmitter and receiver in a wireless communication system, based on OFDM, wherein the program code comprises instructions for executing the method according to the first aspect, or any previous possible implementation of the method according to the first aspect.

According to some embodiments disclosed herein, a maximum likelihood estimation, or near-maximum likelihood estimation of the frequency offset is provided, which improves significantly and non-trivially over the current state of the art at an affordable complexity cost. Thanks to the herein disclosed method, fractional frequency offset may be estimated considerably faster and with less computational effort than according to prior art methods such as the extended baseline algorithm. Thereby, an improved and near optimal algorithm in the sense that it is extremely close to exact maximum likelihood estimation is achieved. Thus an improved performance within a wireless communication system is provided.

Other objects, advantages and novel features of the aspects of the disclosed solutions will become apparent from the following detailed description.

BRIEF DESCRIPTION OF THE DRAWINGS

Various embodiments will be more readily understood by reference to the following description, taken with the accompanying drawings, in which.

DETAILED DESCRIPTION

Embodiments described herein are defined as a receiver and a method in a receiver, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
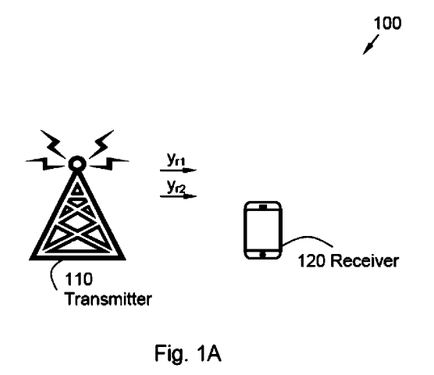
FIG. 1A is an illustration of system architecture comprising a transmitter and a receiver, according to an embodiment.

FIG. 1A is a schematic illustration over a wireless communication system 100 comprising a transmitter 110 communicating with a receiver 120. In the illustrated example, a first pilot signal $y_{r1}$ and a second pilot signal $y_{r2}$ are transmitted by the transmitter 110 to be received by the receiver 120. The first pilot signal $y_{r1}$ may be received at the time r1 and the second pilot signal $y_{r2}$ may be received at the time r2.

The wireless communication system 100 may at least partly be based on any arbitrary OFDM based access technology such as e.g. 3GPP Long Term Evolution (LTE), LTE-Advanced, LTE fourth generation mobile broadband standard, Evolved Universal Terrestrial Radio Access Network (E-UTRAN), Worldwide Interoperability for Microwave Access (WiMax), WiFi, just to mention some few options.

The wireless communication system 100 may be configured to operate according to the Time-Division Duplex (TDD), or Frequency Division Duplexing (FDD) principles for multiplexing, according to different embodiments.

In the illustrated wireless communication system 100 the transmitter 110 comprises a radio network node and the receiver 120 comprises a UE, wherein the radio network node may be serving one or more cells.

The purpose of the illustration in FIG. 1A is to provide a simplified, general overview of the methods and nodes, such as the transmitter 110 and receiver 120 herein described, and the functionalities involved. The methods, transmitter 110 and receiver 120 will subsequently, as a non-limiting example, be described in a 3GPP/LTE environment, but the embodiments of the disclosed methods, transmitter 110 and receiver 120 may operate in a wireless communication system 100 based on another access technology such as e.g. any of the above enumerated. Thus, although the embodiments of the method are described based on, and using the lingo of, 3GPP LTE systems, it is by no means limited to 3GPP LTE.

The transmitter 110 may according to some embodiments be referred to as e.g. a radio network node, a base station, a NodeB, an evolved Node Bs (eNB, or eNode B), a base transceiver station, an Access Point Base Station, a base station router, a Radio Base Stations (RBS), a macro base station, a micro base station, a pico base station, a femto base station, a Home eNodeB, a sensor, a beacon device, a relay node, a repeater or any other network node configured for communication with the receiver 120 over a wireless interface, depending e.g. of the radio access technology and terminology used.

The receiver 120 may correspondingly, in some embodiments, be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the transmitter 110, according to different embodiments and different vocabulary used.

Figure 1B:
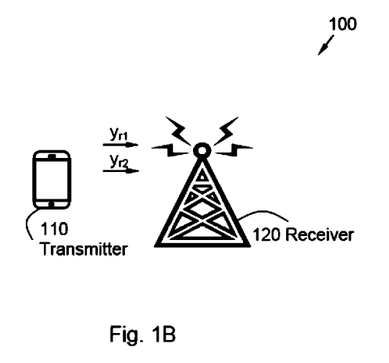
FIG. 1B is an illustration of system architecture comprising a transmitter and a receiver, according to an embodiment.

However, in other alternative embodiments, as illustrated in FIG. 1B, the situation may be reversed. Thus the receiver 120 in some embodiments may be represented by e.g. a radio network node, a base station, a NodeB, an eNB, or eNode B, a base transceiver station, an Access Point Base Station, a base station router, a RBS, a macro base station, a micro base station, a pico base station, a femto base station, a Home eNodeB, a sensor, a beacon device, a relay node, a repeater or any other network node configured for communication with the transmitter 110 over a wireless interface, depending e.g. of the radio access technology and terminology used.

Thereby, also in some such alternative embodiments the transmitter 110 may be represented by e.g. a UE, a wireless communication terminal, a mobile cellular phone, a PDA, a wireless platform, a mobile station, a portable communication device, a laptop, a computer, a wireless terminal acting as a relay, a relay node, a mobile relay, a CPE, a Fixed Wireless Access FWA nodes or any other kind of device configured to communicate wirelessly with the receiver 120, according to different embodiments and different vocabulary used.

The transmitter 110 is configured to transmit radio signals comprising information to be received by the receiver 120. Correspondingly, the receiver 120 is configured to receive radio signals comprising information transmitted by the transmitter 110.

The illustrated network setting of one receiver 120 and one transmitter 110 in FIG. 1A and FIG. 1B respectively, are to be regarded as non-limiting examples of different embodiments only. The wireless communication system 100 may comprise any other number and/or combination of transmitters 110 and/or receiver/s 120, although only one instance of a receiver 120 and a transmitter 110, respectively, are illustrated in FIG. 1A and FIG. 1B, for clarity reasons. A plurality of receivers 120 and transmitters 110 may further be involved in some embodiments.

Thus whenever "one" or "a/an" receiver 120 and/or transmitter 110 is referred to in the present context, a plurality of receivers 120 and/or transmitter 110 may be involved, according to some embodiments.

According to some embodiments, the objective of the method is to perform a Maximum Likelihood (ML) estimation of the FFO, that is:

$$\hat{\epsilon}_{FFO} = \arg\max_{100} \Pr(y_{r1}, y_{r2}; \phi),$$

where $\Pr(y_{r1}, y_{r2}; \phi)$ is the likelihood function for the FFO given the two observed signals $y_{r1}, y_{r2}$ where $y_k = s_k + n_k$ and $n_k$ is zero mean proper complex Gaussian noise with covariance matrix $N_0 I$. Further, a target may be to deal with an FFO that is uniformly distributed in the interval $[-0.5, 0.5]$. Note that as ML estimation is targeted, it is not possible to improve over the herein disclosed method.

The ML estimator may in some embodiments be conceptually uncomplicated to implement. The bottleneck is that the complexity of a straightforward implementation is prohibitive. As quasi-ML algorithm may be utilised as a remedy, wherein the result is virtually indistinguishable from full ML while at the same time having low computational cost.

The complexity of the proposed method may in some embodiments be essentially three times the baseline method plus a small overhead.

The key observation behind the provided method is that a Karhunen-Loeve approximation, up to any finite order of a log-likelihood function $\lambda(\phi) = \log \Pr(y_{r1}, y_{r2}; \phi)$, wherein, from now and onwards, it is omitted to explicitly denote the dependency of $y_{r1}, y_{r2}$ on $\lambda(\phi)$, is for all practical purposes three dimensional. This means that when the log-likelihood function $\lambda(\phi)$ is evaluated at three positions, complete information may be obtained about the entire function $\lambda(\phi)$. Computing those three values may involve approximately three times the complexity of the baseline method. Then a search over $\lambda(\phi)$ may follow, and this search is of less complexity than the baseline method itself.

With the notation introduced earlier, the log-likelihood of the frequency offset hypothesis $\epsilon_{FFO} = \phi$ given the received signals $y_{r1}, y_{r2}$ is $$\lambda(\phi) \infty - \begin{bmatrix} P_{r1}^{-1} Q D_{r1}^H(\phi) y_{r1} \\ P_{r2}^{-1} Q D_{r2}^H(\phi) y_{r2} \end{bmatrix}^H (\Lambda + N_0 I_{2N_{FFT}})^{-1} \begin{bmatrix} P_{r1}^{-1} Q D_{r1}^H(\phi) y_{r1} \\ P_{r2}^{-1} Q D_{r2}^H(\phi) y_{r2} \end{bmatrix},$$

where $P_k$ is a diagonal matrix with $p_k$ along its diagonal, and the matrix $\Lambda$ is the covariance matrix of the channel in the frequency domain, i.e., $$\Lambda = E\left[\begin{bmatrix} \text{diag}(H_{r1}) \\ \text{diag}(H_{r2}) \end{bmatrix} \begin{bmatrix} \text{diag}(H_{r1}) \\ \text{diag}(H_{r2}) \end{bmatrix}^H\right]$$

where $\text{diag}(X)$ is a column vector with elements taken from the main diagonal of X. In practical applications, the covariance $\Lambda$ may be unknown at the time of FFO estimation. Therefore the problem may be simplified by replacing $\Lambda$ with an identity matrix. By doing so, the following expression for the log-likelihood function is reached, after a few manipulations:

$$\lambda(\phi) \infty - 2\text{Re}\{[P_{r1}^{-1} Q D_{r1}^H(\phi) y_{r1}]^H [P_{r2}^{-1} Q D_{r2}^H(\phi) y_{r2}]\}.$$

A full Maximum Likelihood estimator may now compute the value $\lambda(\phi)$ for all possible $\phi$, quantized to the desired accuracy, and then select as output the $\phi$ that maximizes $\lambda(\phi)$. This is, however, of impractical complexity, why a more economical method is pursued.

The function $\lambda(\phi)$ is a random function, and it therefore possesses a Karhunen-Loeve basis expansion as $$\lambda(\phi) = \sum_k \alpha_k \vartheta_k(\phi),$$

where $\vartheta_k(\phi)$ are eigenfunctions of the kernel:

$$K(\phi_1, \phi_2) = E[\lambda(\phi_1)\lambda(\phi_2)].$$

The key observation is now that most eigenvalues of $K(\phi_1, \phi_2)$ are very small. In fact, only three of the eigenvalues comprises around 99.9% of the total mass of the kernel. More precisely, let $\beta_k$ denote the eigenvalues of $K(\phi_1, \phi_2)$ corresponding to the eigenfunctions $\vartheta_k(\phi)$, and sort the eigenvalues in descending order. Then, for all LTE settings, it is observed that:

$$\beta_1 + \beta_2 + \beta_3 > 0.999 \sum_k \beta_k.$$

The implication of this observation is that the log-likelihood function $\lambda(\phi)$ is, for all practical purposes, three dimensional, i.e., $$\sum_k \alpha_k \vartheta_k(\phi) = \lambda(\phi) \cong \lambda_3(\phi) \square \sum_{k=1}^{3} \alpha_k \vartheta_k(\phi).$$

Finding a closed form for the eigenfunctions $\vartheta_k(\phi)$ may be difficult as they change for the different LTE settings. For that reason, another set of functions has to be found that covers as much mass as possible of the kernel. Such set of three basis functions has not been found; however, by ignoring to take the real-value of the likelihood function, the calculations may be reduced to:

$$\lambda^c(\phi) \propto [P_{r1}^{-1} Q D_{r1}^H(\phi) y_{r1}]^H [P_{r2}^{-1} Q D_{r2}^H(\phi) y_{r2}],$$

instead of its real part. By doing so it has by inspection been found that the kernel of the complex likelihood is 6-dimensional, three dimensions relates to the real-part, and another three to the imaginary part.

Now, an excellent set of (non-orthogonal) basis functions for close approximation of $\lambda^c(\phi)$ is the following: $\phi_k(\phi) = \exp(-i2\pi\phi[\Delta+f_k])$. The parameter $f_k$ is subject to optimization, and it may be considered to use $f_k=(k-2)f_\Delta$ for some $f_\Delta$. It is noted that although not strictly optimal in any LTE setting, $f_\Delta=0.5$ may be a good, however non-limiting example of an appropriate choice across all LTE settings.

The next step is to compute $\lambda^c(\phi)$ at three different values of $\phi$, such as e.g. at $\phi=-\theta,0,\theta$. This produces the three complex values $\lambda^c(-\theta), \lambda^c(0), \lambda^c(\theta)$. Since the complex log-likelihood $\lambda^c(\phi)$ is essentially 6-dimensional, the three computed values are sufficient for determining the entire function. Thus:

$$\lambda_3^c(-\theta) = \sum_{k=1}^{3} \alpha_k \varphi_k(-\theta),\ \lambda_3^c(0) = \sum_{k=1}^{3} \alpha_k \varphi_k(0),\ \lambda_3^c(\theta) = \sum_{k=1}^{3} \alpha_k \varphi_k(\theta).$$

In other words:

$$\begin{bmatrix} \lambda_3^c(-\theta) \\ \lambda_3^c(0) \\ \lambda_3^c(\theta) \end{bmatrix} = \begin{bmatrix} \varphi_1(-\theta) & \varphi_2(-\theta) & \varphi_3(-\theta) \\ \varphi_1(0) & \varphi_2(0) & \varphi_3(0) \\ \varphi_1(\theta) & \varphi_2(\theta) & \varphi_3(\theta) \end{bmatrix} \begin{bmatrix} \alpha_1 \\ \alpha_2 \\ \alpha_3 \end{bmatrix} = A \begin{bmatrix} \alpha_1 \\ \alpha_2 \\ \alpha_3 \end{bmatrix},$$

$$A = \begin{bmatrix} \varphi_1(-\theta) & \varphi_2(-\theta) & \varphi_3(-\theta) \\ \varphi_1(0) & \varphi_2(0) & \varphi_3(0) \\ \varphi_1(\theta) & \varphi_2(\theta) & \varphi_3(\theta) \end{bmatrix}.$$

The coefficients $\{\alpha_k\}_{k=1}^{3}$ may then be expressed:

$$\begin{bmatrix} \alpha_1 \\ \alpha_2 \\ \alpha_3 \end{bmatrix} = A^{-1} \begin{bmatrix} \lambda_3^c(-\theta) \\ \lambda_3^c(0) \\ \lambda_3^c(\theta) \end{bmatrix}.$$

It may be noted that the matrix $A^{-1}$ is always fixed for given LTE settings. For example, when $\theta=0.311$ (the selection of value for $\theta$ will be commented on later), $f_\Delta=0.5$, using OFDM symbols 4 and 7, and use the normal cyclic prefix of LTE, then:

$$A^{-1} = \begin{bmatrix} -0.5692 + .2977i & 1.1344 & -0.5692 - .2977i \\ 1.1343 + 0.0077i & -1.2687 & 1.1343 - 0.0077i \\ -0.5651 - 0.3054i & 1.1344 & -0.5651 + 0.3054i \end{bmatrix}.$$

Thus, there is no need for online matrix inversion, and finding the coefficients $\{\alpha_k\}_{k=1}^{3}$ may be done through 9 multiplications. At this point, an approximation $\lambda_3(\phi)$ to the log-likelihood $\lambda(\phi)$ has been established, namely:

$$\lambda(\phi) \cong \lambda_3(\phi) = \text{Re}\{\lambda_3^c(\phi)\} = \text{Re}\left\{\sum_{k=1}^{3} \alpha_k \varphi_k(\phi)\right\}.$$

This is a remarkable result, as the complexity of computing one value of the log-likelihood thereby becomes very low as only three multiplications may be required, which saves computing resources and time.

Next step is to estimate the FFO. On the most fundamental level, any optimization algorithm that can find the maximum of an arbitrary function f(x) may be applied. However, in some embodiments, the following algorithm may be used:

1. Compute P values of $\lambda_3(\phi)$ at $\phi \in \{\phi_1, \phi_1, \ldots, \phi_P\}$, where $\phi_m=2m-1-P/2P$. Denote the value $\lambda_3(\phi_m)$ by $\lambda_m$, $1 \leq m \leq P$.
2. Find the maximum of $\lambda_m$, $1 \leq m \leq P$, $m_{max}=\arg\max_m \lambda_m$. The maximum of $\lambda_3(\phi)$, i.e., the estimated FFO, may then be assumed to lie within the interval:

$$\phi \in \left[\frac{2m_{max} - 2 - P}{2P}, \frac{2m_{max} - P}{2P}\right].$$

Further, when P is large enough, it may be assumed that $\lambda_3(\phi)$ has only a single maximum in the interval $$\phi \in \left[\frac{2m_{max} - 2 - P}{2P}, \frac{2m_{max} - P}{2P}\right].$$

3. Apply any line search algorithm to find the maximum of $\lambda_3(\phi)$ in:

$$\phi \in \left[\frac{2m_{max} - 2 - P}{2P}, \frac{2m_{max} - P}{2P}\right].$$

In some non-limiting embodiments, a golden section search with M iterations may be performed.

The precision that can be achieved with M iterations of the golden section search for P initial points in step 2 is $1/P(\zeta/1-\zeta)^M$ where $\zeta=1.618033\ldots$ is the golden ratio. Based on simulations, it has been found that $P=20$ may be sufficient in the sense that the Root Mean Square (RMS) error is not improved by further increase of P, and with $M=15$ iterations, the final estimation precision may be, on a normalised scale, equal to $3.67 \times 10^{-5}$, which corresponds to about 0.5 Hz. This is by far sufficient for all practical aspects of LTE.

For P initial points in step 2, and M golden section search iterations, $M+P+2$ function evaluations of a $\lambda_3(\phi)$ may be made. For each one of these function evaluations, three multiplications may be made. For the particular choice of $P=20$ and $M=15$, this evaluates to 111 multiplications, once $\{\alpha_k\}_{k=1}^{3}$ have been found.

Figure 2:
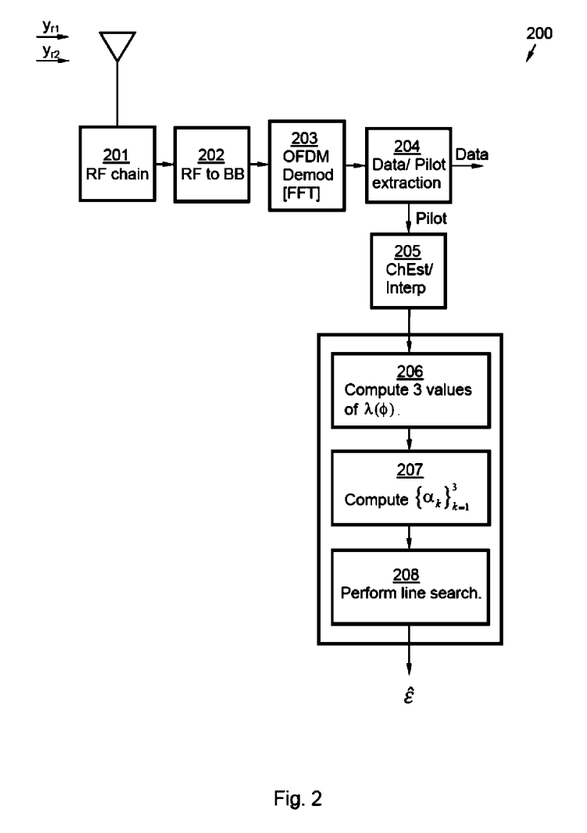
FIG. 2 is a flow chart illustrating a method according to some embodiments.

FIG. 2 illustrates an example of an embodiment of a method 200 in a receiver 120. The method 200 may comprise a number of actions 201-208 in order to estimate a frequency offset between transmitter 110 and receiver 120.

Two pilot signals $y_{r1}, y_{r2}$ are received from the transmitter 110 via an antenna in a first action 201, at the respective points in time, r1 and r2. The received pilot signals $y_{r1}, y_{r2}$ may be transmitted to a base band unit in a further action 202. Also, an OFDM demodulation may be performed, 203, where after data and pilot symbols may be extracted 204 from the received pilot signals $y_{r1}, y_{r2}$. Based on the extracted pilot symbols, channel estimation 205 may be made by comparing the received pilot symbols with stored pilot values.

Thereafter in an action 206, corresponding to previously discussed step 1, three values of $\lambda(\phi)$ may be computed. In an additional action 207, which may correspond to step 2 above, $\{\alpha_k\}_{k=1}^{3}$ may be calculated. Finally, in action 208, a linear and/or golden section search may be performed for finding the maximum of $\lambda_3(\phi)$.

The embodiments disclosed herein allows for near Maximum Likelihood estimation of the FFO in LTE systems. The maximum FFO that can be estimated is not limited in size, according to some embodiments.

Figure 3:
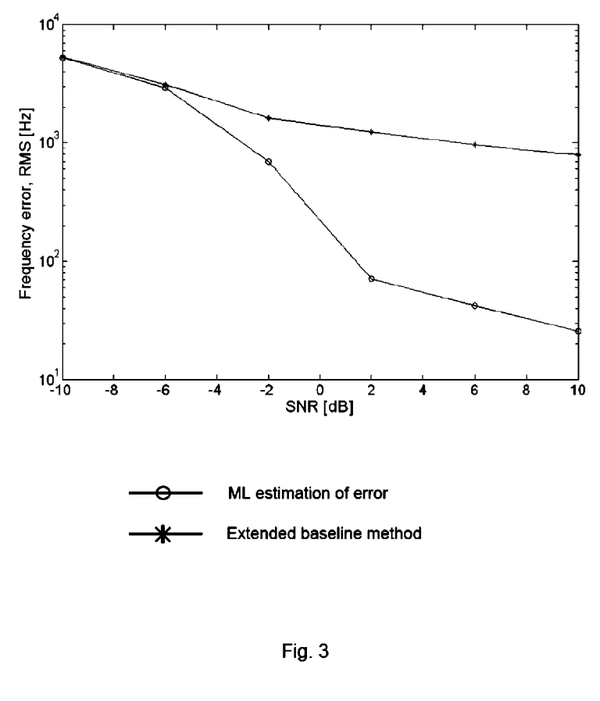
FIG. 3 is a diagram illustrating a comparison between a method according to some embodiments and prior art.

FIG. 3 illustrates an example of the performance of the disclosed algorithm according to an embodiment, compared with the extended baseline. The system settings correspond to a Single-Input Single-Output (SISO) LTE system operating at 10 MHz bandwidth. For the disclosed method embodiment, P=20, and M=15. The disclosed method decisively outperforms the extended baseline, and at high Signal-to-Noise Ratio (SNR) a 200-fold reduction of the RMS FFO error may be observed. It may also be noted that the curve of the disclosed method bends at around SNR 2 dB. This is not due to insufficient simulations, but is a natural behaviour of maximum likelihood estimation. At low SNR, the maximum likelihood estimator (which is the optimal estimator) is prone to make major FFO errors. As the SNR increases, the probability to make a major error rapidly decreases, and at SNR 2 dB, there are virtually no major FFO errors left. This explains the error floor.

Instead of the herein used measurement SNR, any other similar appropriate measurement may be utilised in other embodiments, such as e.g. Signal-to-Interference-plus-Noise Ratio (SINR), Signal-to-Interference Ratio (SIR), Signal-to-Noise-plus-Interference Ratio (SNIR), Signal-to-Quantization-Noise Ratio (SQNR), Signal, noise and distortion (SI-NAD), or any inverted ratio such as Noise to Signal ratio, which compare the level of a desired signal to the level of background noise in a ratio.

Figure 4:
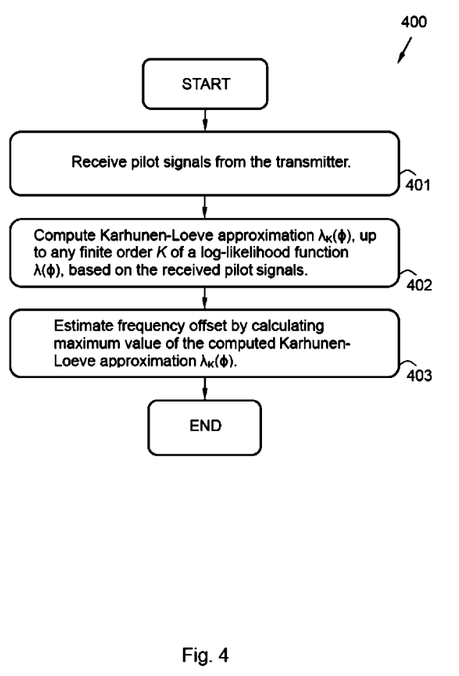
FIG. 4 is a flow chart illustrating a method according to some embodiments.

FIG. 4 illustrates an example of a method 400 in a receiver 120 according to some embodiments, for estimating a normalised frequency offset between a transmitter 110 and the receiver 120 in a wireless communication system 100, based on OFDM.

The normalised frequency offset may be a FFO, which also may be expressed: $\epsilon_{FFO}$, where $\epsilon_{FFO} \in [-½, ½]$.

The wireless communication system 100 may be e.g. a 3GPP LTE system in some embodiments.

The receiver 120 may be represented by a mobile terminal or UE, and the transmitter 110 may be represented by a radio network node or eNodeB, or vice versa, in different embodiments.

However, in some embodiments, both the transmitter 110 and the receiver 120 may be represented by radio network nodes forming a backhaul link. Thanks to embodiments herein, tuning and adjustment of the respective radio network nodes may be simplified, and the communication link may be upheld, also when e.g. transmitter warmth creates or render additional frequency offset.

Also, one or both of the transmitter 110 and/or the receiver 120 may be mobile, e.g. a mobile relay node or micro node on the roof of a bus, forming a backhaul link with a macro node.

Further, both the transmitter 110 and the receiver 120 may be represented by mobile terminals in an ad-hoc network communication solution.

To appropriately estimate a normalised frequency offset between transmitter 110 and receiver 120, the method 400 may comprise a number of actions 401-403.

It is however to be noted that any, some or all of the described actions 401-403, may be performed in a somewhat different chronological order than the enumeration indicates, be performed simultaneously or even be performed in a completely reversed order according to different embodiments. Further, it is to be noted that some actions 401-403 may be performed in a plurality of alternative manners according to different embodiments, and that some such alternative manners may be performed only within some, but not necessarily all embodiments. The method 400 may comprise the following actions:

Action 401

A first pilot signal $y_{r1}$ and a second pilot signal $y_{r2}$ is received from the transmitter 110. The first pilot signal $y_{r1}$ is received at time r1 and the second pilot signal $y_{r2}$ is received at time r2, where r1≠r2.

The pilot signals $y_{r1}$, $y_{r2}$ are wireless radio signals, transmitted e.g. in a single frequency, transmitted over the wireless communication system 100 for supervisory, control, equalization, continuity, synchronisation, and/or reference purposes.

Using the transmitted pilot signals $y_{r1}$, $y_{r2}$ that are transmitted by the transmitter 110 for other purposes, an estimation of the FFO may be made without addition of any dedicated of signalling, which is an advantage.

Action 402

A Karhunen-Loeve approximation $\lambda_k(\phi)$ is computed, up to any finite order K of a log-likelihood function $\lambda(\phi)$, based on the received 401 pilot signals $y_{r1}$, $y_{r2}$.

The representation of the log-likelihood function $\lambda(\phi)$ may comprise a set of three basis functions $\phi_1(\phi)$, $\phi_2(\phi)$, $\phi_3(\phi)$. Such basis functions $\phi_1(\phi)$, $\phi_2(\phi)$, $\phi_3(\phi)$ may be constructed on the form: $\phi_k(\phi)=\exp(-i2\pi\phi[\Delta+f_k])$ in some embodiments. The parameter $f_k$ may be computed by: $f_k=(k-2)\cdot f_{66}$; wherein $0.3 \leq f_{66} \leq 0.7$ and $1 \leq k \leq 3$. Furthermore, in some embodiments $f_\Delta=0.5$.

Furthermore, the log-likelihood functions $\lambda_3(\phi)$ may be constructed, in some embodiments by:

$$\lambda_3(\phi) = \text{Re}\left\{\sum_{k=1}^{3} \alpha_k \cdot \varphi_k(\phi)\right\},$$

wherein $\lambda_3(\phi)$ is an approximation of $\lambda(\phi)$ comprising three basis functions, i.e. k=3.

In further addition, according to some embodiments, three values of the log-likelihood function $\lambda_3(\phi)$ may be evaluated at $\phi = -\theta, 0, \theta$, wherein $0.3 \leq \theta \leq 0.4$. In some particular embodiments, $\theta = 0.311$.

The log-likelihood function $\lambda_3(\phi)$ may be computed by finding the coefficients $a_1, a_2, a_3$ and multiplying them with the corresponding basis functions $\psi_1(\phi), \psi_2(\phi), \psi_3(\phi)$. The coefficients $a_1, a_2, a_3$ may be computed as:

$$\begin{bmatrix} \alpha_1 \\ \alpha_2 \\ \alpha_3 \end{bmatrix} = \begin{bmatrix} \varphi_1(-\theta) & \varphi_2(-\theta) & \varphi_3(-\theta) \\ \varphi_1(0) & \varphi_2(0) & \varphi_3(0) \\ \varphi_1(\theta) & \varphi_2(\theta) & \varphi_3(\theta) \end{bmatrix}^{-1} \begin{bmatrix} \lambda(-\theta) \\ \lambda(0) \\ \lambda(\theta) \end{bmatrix}.$$

Action 403

The frequency offset FFO is estimated, by calculating a maximum value of the computed 402 function $\lambda_3(\phi)$.

The maximum value of the computed 402 function $\lambda_3(\phi)$ may be estimated by application of an arbitrary optimisation algorithm, such as any line search algorithm capable of finding a local maximum of a function, such as e.g. the Newton-Raphson method, the Secant method, the Backtracking line search, the Nelder-Mead method and/or golden section search, or other similar method.

According to some embodiments, the maximum value of the computed 402 function $\lambda_3(\phi)$ may be estimated by selecting P values $\phi$ such that $\phi \in \{\phi_3, \phi_2, \ldots, \phi_P\}$ lies within [−0.5, 0.5]. Also, P values of $\lambda_3(\phi)$ at $\phi \in \{\phi_1, \phi_2, \ldots, \phi_P\}$ may be computed. Furthermore, the biggest value of $\lambda_3(\phi)$, denoted by $\lambda_{max}$, as $\lambda_{max} = \max \lambda_3(\phi_m)$, $1 \leq m \leq P$, and corresponding value of $\phi$ denoted $\phi_{max}$ may be determined. Finally, the determined biggest value $\lambda_{max}$ and corresponding value $\phi_{max}$ may be utilised as a starting point in a line search algorithm to find the maximum of $\lambda_3(\phi)$.

In further addition, when the biggest value $\lambda_{max}$ and corresponding value $\lambda_{max}$ have been determined, an assumption may be made that the maximum value of $\lambda_3(\phi)$ is within an interval:

$$\phi \in \frac{2\phi_{max} - 2 - P}{2P}, \frac{2\phi_{max} - P}{2P}.$$

In some embodiments, a golden section search with M iterations may be performed for finding the maximum value of $\lambda_3(\phi)$ within the interval.

By performing the disclosed estimation by the quasi maximum likelihood method 400, but not a full maximum likelihood algorithm, accurate frequency offset estimation is achieved, without introducing the complex, time consuming and resource demanding efforts that a full maximum likelihood algorithm would require. Thereby, time and computational power are saved.

Figure 5A:
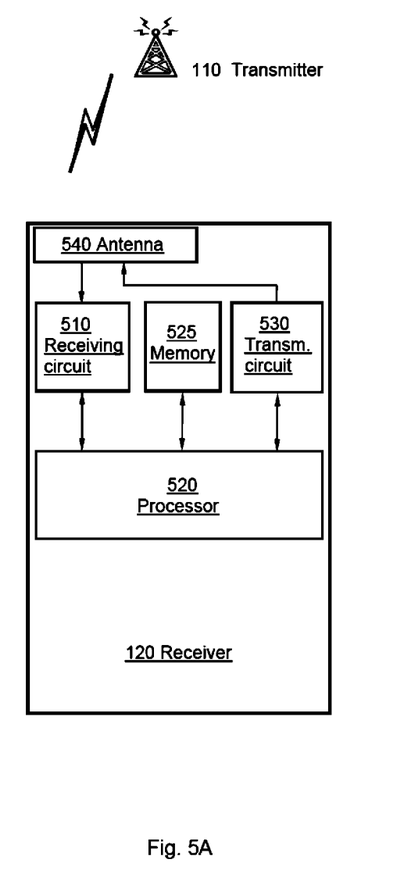
FIG. 5A is a block diagram illustrating a receiver according to an embodiment.

FIG. 5A illustrates an embodiment of a receiver 120 comprised in a wireless communication system 100. The receiver 120 is configured for performing at least some of the previously described method actions 401-403, for estimating a normalised frequency offset between a transmitter 110 and the receiver 120 in a wireless communication system 100, based on OFDM. The wireless communication network 100 may be based on 3GPP LTE.

Thus the receiver 120 is configured for performing the method 400 according to at least some of the actions 401-403. For enhanced clarity, any internal electronics or other components of the receiver 120, not completely indispensable for understanding the herein described embodiments has been omitted from FIG. 5A.

The receiver 120 comprises a receiving circuit 510, configured for receiving a first pilot signal $y_{r1}$ and a second pilot signal $y_{r2}$ from the transmitter 110. The receiver 120 may also be configured for receiving wireless signals from the transmitter 110 or from any other entity configured for wireless communication over a wireless interface according to some embodiments.

Furthermore, the receiver 120 comprises a processor 520, configured for computing a Karhunen-Loeve approximation $\lambda_K(\phi)$, up to any finite order K of a log-likelihood function $\lambda(\phi)$, based on the received pilot signals $y_{r1}$, $y_{r2}$, and also configured for estimating the frequency offset by calculating a maximum value of the computed Karhunen-Loeve approximation $\lambda_K(\phi)$.

Furthermore, in some embodiments, the processor 520 may be further configured for implementing the method 400 any of the above described actions 402 and 403.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In addition according to some embodiments, the receiver 120, in some embodiments, may also comprise at least one memory 525 in the receiver 120. The optional memory 525 may comprise a physical device utilised to store data or programs, i.e., sequences of instructions, on a temporary or permanent basis in a non-transitory manner According to some embodiments, the memory 525 may comprise integrated circuits comprising silicon-based transistors. Further, the memory 525 may be volatile or non-volatile.

In addition, the receiver 120 may comprise a transmitting circuit 530, configured for transmitting wireless signals within the wireless communication system 100.

Furthermore, the receiver 120 may also comprise an antenna 540. The antenna 540 may optionally comprise an array of antenna elements in an antenna array in some embodiments.

The actions 401-403 to be performed in the receiver 120 may be implemented through the one or more processors 520 in the receiver 120 together with computer program product for performing the functions of the actions 401-403.

Thus a non-transitory computer program comprising program code for performing the method 400 according to any of actions 401-403, for estimating frequency offset between a transmitter 110 and the receiver 120 in a wireless communication system 100, based on OFDM, when the computer program is loaded into a processor 520 of the receiver 120.

The non-transitory computer program product may comprise a computer readable storage medium storing program code thereon for estimating frequency offset between transmitter 110 and receiver 120 in a wireless communication system 100, based on OFDM, wherein the program code comprises instructions for executing a method 400 comprising receiving 401 a first pilot signal $y_{r1}$ and a second pilot signal $y_{r2}$ from the transmitter 110. Additionally, the method 400 comprises computing 402 a Karhunen-Loeve approximation $\lambda_K(\phi)$, up to any finite order K of a log-likelihood function $\lambda(\phi)$ based on the received 401 pilot signals $y_{r1}$, $y_{r2}$. Also, the method 400 further comprises estimating 403 the frequency offset by calculating a maximum value of the computed 402 Karhunen-Loeve approximation $\lambda_K(\phi)$.

The non-transitory computer program product mentioned above may be provided for instance in the form of a non-transitory data carrier carrying computer program code for performing at least some of the actions 401-403 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non transitory manner. The non-transitory computer program product may furthermore be provided as computer program code on a server and downloaded to the receiver 120, e.g., over an Internet or an intranet connection.

Figure 5B:
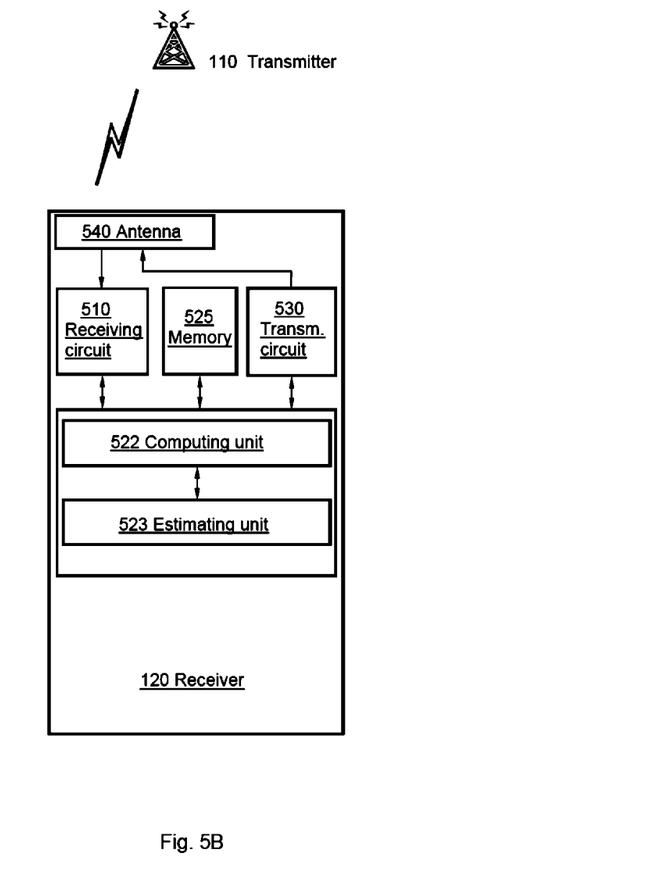
FIG. 5B is a block diagram illustrating a receiver according to an alternative embodiment.

FIG. 5B illustrates an embodiment of a receiver 120 comprised in a wireless communication system 100. The receiver 120 is configured for performing at least some of the previously described method actions 401-403, for estimating a normalised frequency offset between a transmitter 110 and the receiver 120 in a wireless communication system 100, based on OFDM. The illustrated receiver 120 is similar to the embodiment depicted in FIG. 5A, and may comprise a receiving circuit 510, a memory 525, a transmission circuit 530, and an antenna 540 identical with, or corresponding to, the same-numbered units illustrated in the receiver embodiment depicted in FIG. 5A.

However, the illustrated embodiment of the receiver 120 may comprise a computing unit 522, configured for computing 402 a Karhunen-Loeve approximation $\lambda_K(\phi)$, up to any finite order K of a log-likelihood function $\lambda(\phi)$, based on received 401 pilot signals $y_{r1}$, $y_{r2}$. Further, the receiver 120 may also comprise an estimating unit 523, configured for estimating 403 the frequency offset by calculating a maximum value of the computed 402 Karhunen-Loeve approximation $\lambda_K(\phi)$.

The terminology used in the description of the embodiments as illustrated in the accompanying drawings is not intended to be limiting of the described method 400 and/or receiver 120. Various changes, substitutions and/or alterations may be made, without departing from the solution embodiments as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor 520 may fulfil the functions of several items recited in the appended claims. The mere fact that certain measures are recited in mutually different dependent claims does not indicate that a combination of these measures cannot be used to advantage. A computer program may be stored/distributed on a suitable non-transitory medium, such as an optical storage medium or a solid-state medium supplied together with or as part of other hardware, but may also be distributed in other forms such as via Internet or other wired or wireless communication system.

What is claimed is:

1. A method, implemented in a receiver, for estimating a normalised frequency offset between a transmitter and the receiver in a wireless communication system, based on Orthogonal Frequency Division Multiplexing, OFDM, the method comprising:

receiving a first pilot signal ($y_{r1}$) and a second pilot signal ($y_{r2}$) from the transmitter;

computing a Karhunen-Loeve approximation $\lambda_K(\phi)$, up to any finite order K of a log-likelihood function $\lambda(\phi)$, based on the received first and second pilot signals ($y_{r1}$, $y_{r2}$); and estimating the frequency offset by calculating a maximum value of the computed Karhunen-Loeve approximation $\lambda_K(\phi)$;

compensating the frequency offset by a frequency shift.

2. The method according to claim 1, wherein K=3 and the representation $\lambda_3(\phi)$ of the log-likelihood function $\lambda(\phi)$ comprises a set of three basis functions $\phi_1(\phi)$, $\phi_2(\phi)$, $\phi_3(\phi)$.

3. The method according to claim 2, wherein the basis functions $\phi_1(\phi)$, $\phi_2(\phi)$, $\phi_3(\phi)$ are constructed of the form: $\phi(\phi)=\exp(-i2\pi\phi[\Delta+f_k])$.

4. The method according to claim 3, wherein the parameter $f_k$ is computed by:

$f_k=(k-2)\cdot f_\Delta$; wherein $0.3 \leq f_\Delta \leq 0.7$ and $1 \leq k \leq 3$.

5. The method according to claim 4, wherein $f_\Delta=0.5$.

6. The method according to claim 2, wherein the log-likelihood function $\lambda_3(\phi)$ is constructed by:

$$\lambda_3(\phi) = \mathrm{Re}\left\{\sum_{k=1}^{3} \alpha_k \cdot \varphi_k(\phi)\right\}.$$

7. The method according to claim 2, wherein three values of the log-likelihood function $\lambda_3(\phi)$ are evaluated at $\phi=-\theta, 0, \theta$, wherein $0.3 \leq \theta \leq 0.4$.

8. The method according to claim 2, wherein the log-likelihood function $\lambda_3(\phi)$ is computed by finding coefficients $\alpha_1, \alpha_2, \alpha_3$, multiplying the coefficients $\alpha_1, \alpha_2, \alpha_3$ with the corresponding basis functions $\phi_1(\phi), \phi_2(\phi), \phi_3(\phi)$, and then summing the terms.

9. The method according to claim 7, wherein the coefficients $a_1, a_2, a_3$ are computed as:

$$\begin{bmatrix} \alpha_1 \\ \alpha_2 \\ \alpha_3 \end{bmatrix} = \begin{bmatrix} \varphi_1(-\theta) & \varphi_2(-\theta) & \varphi_3(-\theta) \\ \varphi_1(0) & \varphi_2(0) & \varphi_3(0) \\ \varphi_1(\theta) & \varphi_2(\theta) & \varphi_3(\theta) \end{bmatrix}^{-1} \begin{bmatrix} \lambda(-\theta) \\ \lambda(0) \\ \lambda(\theta) \end{bmatrix}.$$

10. The method according to claim 2, wherein a maximum value of the computed function $\lambda_3(\phi)$ is estimated by application of an optimisation algorithm.

11. The method according to claim 2, wherein a maximum value of the computed function $\lambda_3(\phi)$ is estimated by:

selecting P values $\phi$ such that $\phi \in \{\phi_1, \phi_2, \ldots, \phi_P\}$ within $[-0.5, 0.5]$;

computing P values of $\lambda_3(\phi)$ at $\phi \in \{\phi_1, \phi_2, \ldots, \phi_P\}$;

determining a biggest value of $\lambda_3(\phi)$, denoted by $\lambda_{max}$, as $\lambda_{max}=\max \lambda_3(\phi_m)$, $1 \leq m \leq P$, and corresponding value of $\phi$ denoted $\phi_{max}$; and utilising the determined biggest value $\lambda_{max}$ and corresponding value $\phi_{max}$ as a starting point in a line search algorithm to find the maximum of $\lambda_3(\phi)$.

12. The method according to claim 11, wherein, after having determined the biggest value $\lambda_{max}$ and corresponding value $\phi_{max}$, an assumption is made that the maximum value of $\lambda_3(\phi)$ is within an interval:

$$\phi \in \frac{2\phi_{max} - 2 - P}{2P}, \frac{2\phi_{max} - P}{2P}.$$

13. The method according to claim 12, wherein a golden section search with M iterations is performed for finding the maximum value of $\lambda_3(\phi)$ within the interval.

14. The method according to claim 1, wherein the receiver is included in a User Equipment, UE, and the transmitter is included in a radio network node.

15. A receiver, for estimating a normalised frequency offset between a transmitter and the receiver in a wireless communication system, based on Orthogonal Frequency Division Multiplexing, OFDM, said receiver comprising:

a receiving circuit, configured to receive a first pilot signal ($y_{r1}$) and a second pilot signal ($y_{r2}$) from the transmitter;

a processor, configured to compute a Karhunen-Loeve approximation $\lambda$hd K($\phi$), up to any finite order K of a log-likelihood function $\lambda(\phi)$ based on the received first and second pilot signals ($y_{r1}, y_{r2}$), and also configured to estimate the frequency offset by calculating a maximum value of the computed Karhunen-Loeve approximation $\lambda_K(\phi)$;

the processor is further configured to compensate the frequency offset by a frequency shift.

* * * * *

UNITED STATES PATENT AND TRADEMARK OFFICE
CERTIFICATE OF CORRECTION

PATENT NO.         : 9,083,597 B1
APPLICATION NO.    : 14/553845
DATED              : July 14, 2015
INVENTOR(S)        : Rusek et al.

It is certified that error appears in the above-identified patent and that said Letters Patent is hereby corrected as shown below:

In The Claims

Column 18, line 2, "λhd 3(□)" should read -- $\lambda_3(\square)$ --.

Column 18, line 18, "a₁, a₂, a₃" should read -- $\alpha_1, \alpha_2, \alpha_3$ --.

Column 18, line 59, "λhd K(□)" should read -- $\lambda_K(\square)$ --.

Signed and Sealed this
Twelfth Day of January, 2016

Michelle K. Lee
*Director of the United States Patent and Trademark Office*